Nov. 10, 1931.  S. DOMAGALA  1,830,871
POWER BRUSH CUTTER
Filed Aug. 16, 1930  2 Sheets-Sheet 1
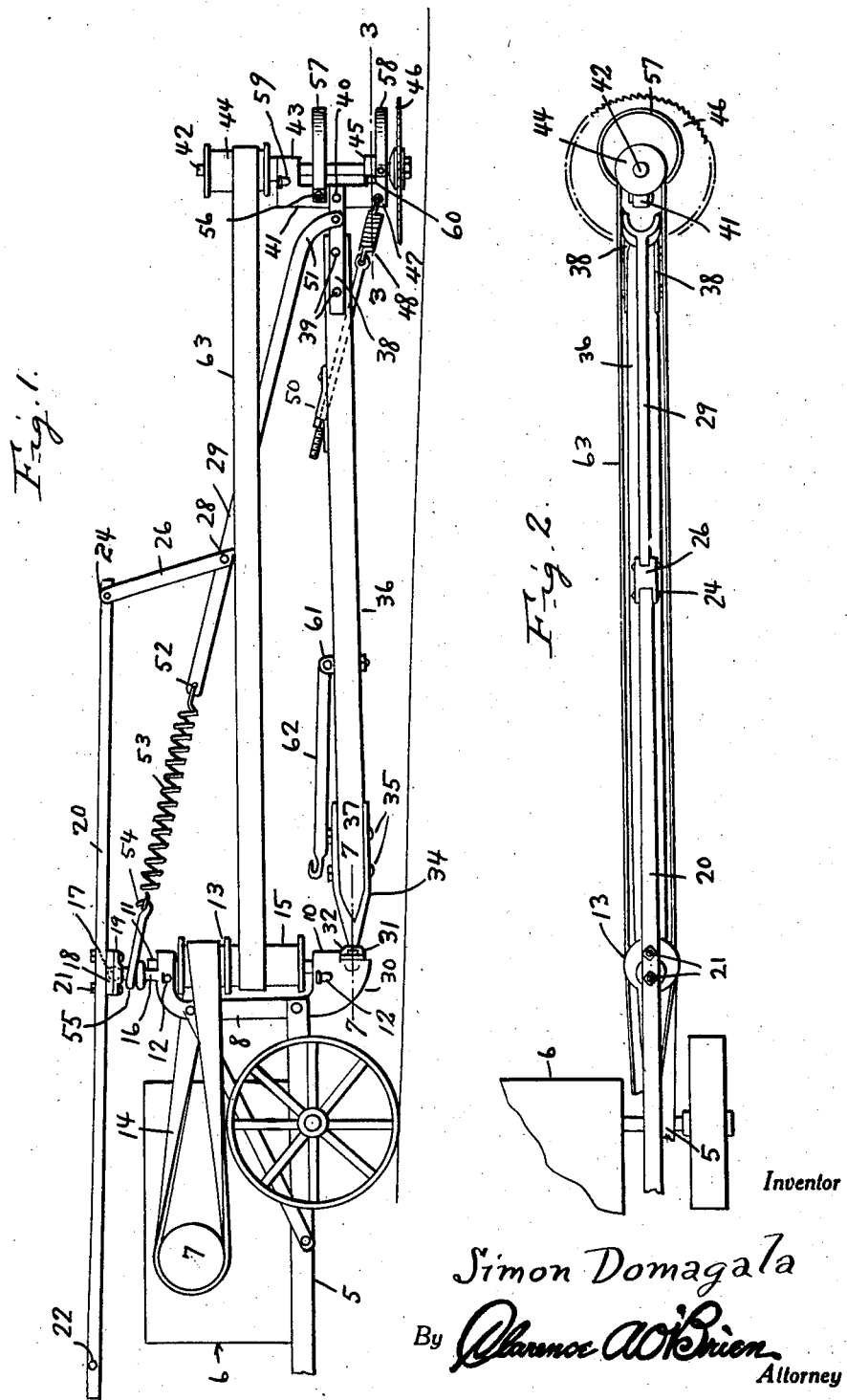
Inventor
Simon Domagala
By Clarence A. O'Brien
Attorney Nov. 10, 1931.  S. DOMAGALA  1,830,871
POWER BRUSH CUTTER
Filed Aug. 16, 1930  2 Sheets-Sheet 2
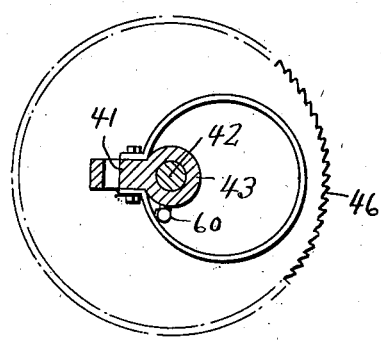
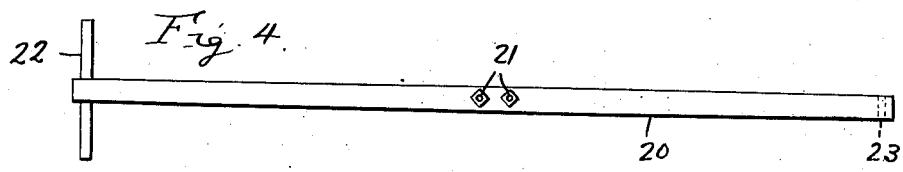
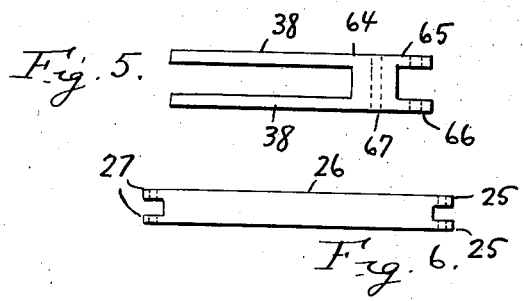
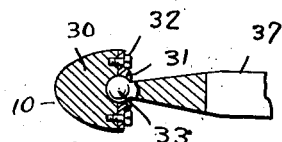
Inventor
Simon Domagala
By Clarence A. O'Brien
Attorney Patented Nov. 10, 1931

1,830,871

UNITED STATES PATENT OFFICE

SIMON DOMAGALA, OF HOLCOMBE, WISCONSIN

POWER BRUSH CUTTER

Application filed August 16, 1930. Serial No. 475,801.

This invention relates to power brush cutters, and machines adapted for clearing ground of brush and trees up to six inch size and particularly to a machine of this character which is more efficient and practical than machines of this type heretofore known.

The invention specifically relates to devices of this type and is adapted to be mounted on and driven by any suitable tractor means or mobile power unit.

It is an object of this invention to provide a machine of the type described, which is highly efficient and mobile, and easily and quickly maneuvered into the proper positions for cutting brush and small trees.

It is well known by practical farmers and woodmen who have continually to deal with the problem of removing brush that any method of driving circular saws in a machine of this type by means of gears and rigid saw rig connections, that the damage resulting to said gear teeth and rigs is very frequent and to such an extent that such rigid coupling means and such brush cutting machines have been found practically useless when they were to be employed on irregular terrain or where the brush and light timber and the like varies considerably in thickness and character. It is equally well known by experienced men that circular saws used in this work are pinched and that they may be overfed or lag behind the forward motion of the tractor or the like, and that when saw rigs of this type encounter such over or underfeeding or some obstruction, that a comparatively great strain is placed upon the power mechanism and rig, which results most frequently in damage thereto.

It is one of the chief objects of this invention to do away with the difficulties mentioned and to provide an efficient, simple, cheaply provided machine of the type described.

It is also an object of this invention to provide a machine of the type described, which may be adapted for mounting upon tractors or mobile power units and such machines may be driven by different power means and connected with said tractor.

It is also an object of this invention to provide a machine of the character described, which employs belts and retractible elements, to insure against the damage mentioned.

Thus it is also an object of the invention to provide a machine of the type described, which embodies means for compensating for the conditions that a forward speed of the tractor means varies with the depth of the saw cut.

It is also an object of the invention to provide a device of the character described, which is capable of efficiently operating where the ground is formed with hills and holes, and in the presence of rocks or boulders or stumps.

It is also an object of this invention to provide a machine of the character described, which is capable of cutting in a wide lateral swath.

It is also an object of the invention to provide a machine of the character described, which is capable of accomplishing the object stated, and other objects to be indicated below, which is easy and simple to operate, and which is composed of few and simple and rugged parts, and which may be effectively operated by a single person, and which can be very cheaply manufactured and assembled.

These and other objects, the nature of the invention, its composition, arrangement and combination of parts will be readily understood by any one acquainted with the art to which this invention relates upon reading the following description of the drawings, in which:

Figure 1 is a side elevational view of the complete machine provided by my invention.

Figure 2 is a top view thereof.

Figure 3 is a horizontal longitudinal section therethrough on the line 3—3 of Figure 1.

Figure 4 is a top view of the boom at the lower end of the operating lever, and

Figure 5 is a view of the link connecting the operating rods with the boom operating lever.

It is to be understood that I do not wish to limit this invention to the particular modification set forth herein to illustrate the same, and any change or changes may be made, consistent with the spirit and scope of the invention.

Referring in detail to the drawings, the numeral 5 designates generally a wheeled tractor or the like having a power plant 6 mounted thereon and having a power pulley 7. On the forward end of the tractor or the like is bolted a generally U-shaped bracket 8, having its wide bight disposed forwardly. Through the upper arm 9 and in the lower arm 10, the ends of the pulley shaft 11 are journaled for rotation therein. Suitable lubrication means 12 are formed in the arms of the U-shaped member. Said U-shaped member is preferably cast with lubrication means formed therein. The shaft 11 is provided with a short pulley 13, which is turned by the pulley 7 by the medium of the belt 14 and rotated by said pulley 13 is a long pulley 15, both of which pulleys are secured to the shaft 11 and the short pulley above the long pulley.

Rising from the arm 9 is formed a long stud 16 having its upper end provided with a bar 17 which is adapted to be received and retained in a bearing housing 18, by a retaining plate 19, said bearing plate and said housing being secured to the under side of a longitudinally disposed operating rod 20, by means of bolts 21.

The operating rod 20 is adapted to extend rearwardly to a convenient position to be reached by the driver of the tractor means, where it is provided with a cross handle 22, the ball bearings permitting the operating rod to be rotated in a plane perpendicular to its longest extension, or to be depressed or raised in a plane co-incident with its extension. The forward end of the operating rod 20 is horizontally apertured to receive a pin 24. The aperture is numbered 23. The pivot 24 is received therein, the pin being journaled across the arm 25 on the upper end thereof of a link member 26, which has at its lower end a U-shaped member having furcations 27, across which is journalled a pivot 28 securing said lower end intermediate the ends of a boom actuating lever 29. The nature of the boom actuating lever 29 will be subsequently described.

The lower arm 10 of the U-shaped member 8 is of substantially greater body than the upper arm 9 and is extended downwardly as at 30 to form a support for another ball bearing housing, provided with a retaining cap 31, secured by bolts 32, to the portion 30. Retained swivelly by said bearing cap 31 is a ball 33 formed on the reduced end of a bifurcated boom supporting member 34, which has heavy bolts passing through the furcations and the boom 36 in the rear end portion 37 which is placed and secured between said furcations.

The forward end of the boom 36 is formed with an attached extension 38 bolted to the sides thereof by bolts 39, the forward end portion of the extension 38 carries a pivot pin 40, at which and between said extension is pivotally carried at a point intermediate its ends is a carrier 41. The carrier 41 is of general U-shaped formation and having its bight disposed forwardly and having one arm disposed above the other. Vertically disposed in and journaled through the arms is a saw shaft 42 carrying at its upper end, beyond the upper arm 43, a long pulley 44 and at its lower end below the arm 45, a circular saw 46 which is with the pulley 44 securely fixed on the shaft for rotation therewith.

The boom operating lever 29 is pivoted to the extension 38 at a point between the forward end of the boom 36 and the saw shaft carrier or support 41. The boom operating lever 29 has its forward end downturned as at 51, where it is bifurcated to straddle the forward extension 38 at the point indicated. The form of the forward extension 38 is indicated in Figure 5, consisting of a body portion 64 provided on one side with the short projections 65 and 66, having holes bored therethrough and provided on the other side with the long extensions 38 and a bore 67 through the body portion to receive a pivot carried by the furcations of the downwardly directed portion of the boom actuating lever. The rear end of the boom actuating lever is apertured as at 32, to receive one end of a coiled spring 53 and the other end of the coiled spring 53 is secured to the element 16. The rearward end of the coiled spring 53 is secured to the element 16 formed on the upper end of a member 8. The spring 53 is of such a construction as to maintain the circular saw at a mean distance from the ground. Mounted on the body portion of the circular saw support 41 as at 56 is a circular horseshoe guard 57 for maintaining the brush from falling upon the mechanism. Mounted to the lower end of the shaft support is a pair of arms 58 for converging the brush or the like into the saw to be cut. Suitable lubricating means 59 and 60 are associated respectively with the upper and the lower arms of the shaft support and formed therein for lubricating the journals of the shaft 42. Intermediately of the ends of the boom 36 and hinged to its upper side as at 61 is a hook 62 for hooking onto the hook 54 when it is desired to fix the boom and sawing mechanism in a position raised from the ground and out of operative position.

The belt 63 is disposed about the companion pulleys 15 and 24, the width of the belt 63 being considerably less than the length of the pulleys and the forward pulley being slightly elevated above the elevation of the rear pulley 15. The formation of the extension 28 attached to the forward end of the boom 36 and supporting the circular saw shaft and supports in a pivotal manner shown in Figure 5, consists of a body portion 64, the rearwardly extending furcations 38 and the short forwardly extending furcations 65, and through which is formed a bore 66, for the reception of the pivot pin 40. The body 64 is likewise provided with a bore 67 for the reception of a pin 68, which pivots the boom actuating lever 29 to the said body portion 64.

It is thought to be obvious that by ringing the bar 20 in a horizontal plane, the saw may be made to operate over a wide swath, as wide as the ball joints will permit it to swing in said horizontal plane.

It is also thought to be obvious that the operating rod 20 may be depressed or raised so as to depress or raise the circular saw mechanism and that the same may be tilted to one side or the other by the same means. Thus it supports of a wide range of adaptability for work about heavy timber, stumps, boulders or uneven ground, which is new and a contribution to the art to which this invention relates. It is thought to be obvious and understood that the spring 48 retains adjustably tight the belt 63 and permits some give upon contact with the work, which adds to the flexibility of the device. Tension adjusting means are provided for the spring.

The construction and operation of my improved power brush cutter is now thought to be clear and it is also thought to be understood that the construction with slight modifications permits of mounting the same on any kind of mobile structures provided with power plants. The spring 53 keeps the device in a flexibile and quickly adjustable condition by permitting instant raising or lowering of the circular saw mechanism without jar and undue friction, enabling a single person operating the device to instantly and quickly depress or raise the saw mechanism to accommodate the ground contour and the present boulders, large timber or other obstructions.

It is though that it will now be understood that a superior power cutter of the type described has been provided, which is simple and efficient, which possesses few and simple parts, and which are easily and quickly and cheaply manufactured and that the invention is admirably adapted for the purpose for which it is designed.

What is claimed is:

1. A power saw of the type described comprising a frame mountable on a vehicle, a motor on said vehicle, a body mounted on the forward end of the frame, a vertical shaft journaled in said body, and a pair of pulleys mounted one over the other on said shaft and fixed to rotate therewith, and a belt connecting said motor and the upper pulley, and a stud on the upper end of the body having a ball at its upper terminal, and a swivel boom projecting forwardly from the said lower forward part of said body, a vertical shaft journalled in a pivoted support, in the forward end of the boom, and a pulley on the upper end of the shaft and a circular saw on the lower end of the shaft, and a belt operatively connecting the lower pulley on the body and said saw shaft pulley, and adjusable spring means cooperating with the lower part of the shaft support and the boom for maintaining the tension of said belt, and spring tensioned means connecting the forward end of the boom and said body for swinging the circular saw into operative position in vertical or horizontal planes.

2. A power saw of the type described comprising a frame on a vehicle, a motor on said vehicle, a body mounted on the forward end of the frame, a vertical shaft journaled in said body, and a pair of pulleys mounted one over the other on said shaft and fixed to rotate therewith, and a belt connecting said motor and the upper pulley, and a swivel boom projecting forwardly from the lower forward part of said body, and a shaft support pivoted on the forward end of the boom and a vertical shaft rotatably journaled in said support, and a pulley on the upper end of the shaft and a circular saw on the lower end of the shaft, and a belt operatively connecting the lower pulley on the body and said saw shaft pulley, and adjustable spring means cooperating the shaft support and the boom for maintaining the tension of said belt, and spring tensioned means connecting the forward end portion of the boom and said body, for swinging the circular saw into operative position in vertical or horizontal planes, said swinging means comprising a rod having a link at its forward end, and provided intermediate its ends with a swivel means cooperable with swivel means on said body, said link comprising a short bar having bifurcated ends, a boom operating lever having its forward portion downwardly directed and bifurcated and pivoted to the forward end of the boom, and a tension coil spring having one end fastened to the boom operating lever and its other end to the body, and the ends of said link pivotally connecting the forward end of the operating rod, and an intermediate portion of the boom operating lever.

In testimony whereof I affix my signature.

SIMON DOMAGALA.